R. L. RAYMER.
YIELDING GEAR.
APPLICATION FILED JULY 28, 1908.
919,767.
Patented Apr. 27, 1909.
2 SHEETS—SHEET 2.
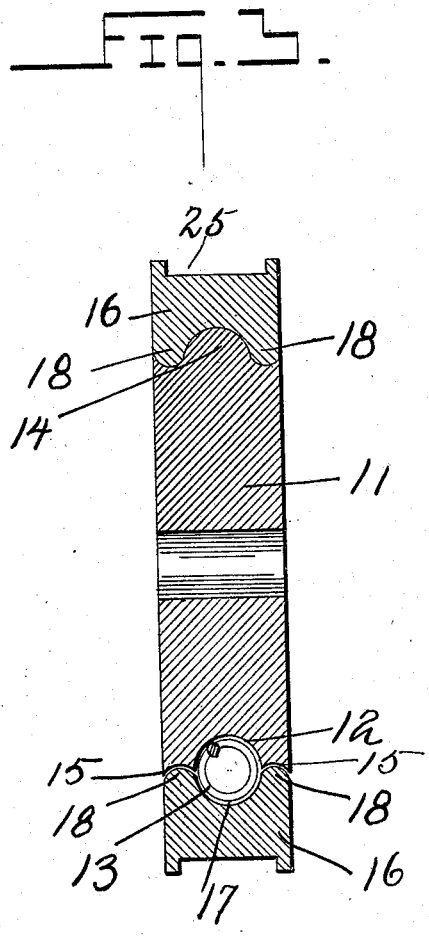
Witnesses
E. E. Johansen
E. L. Chandlee
Inventor
Ralph L. Raymer
By Woodward & Chandlee
Attorneys

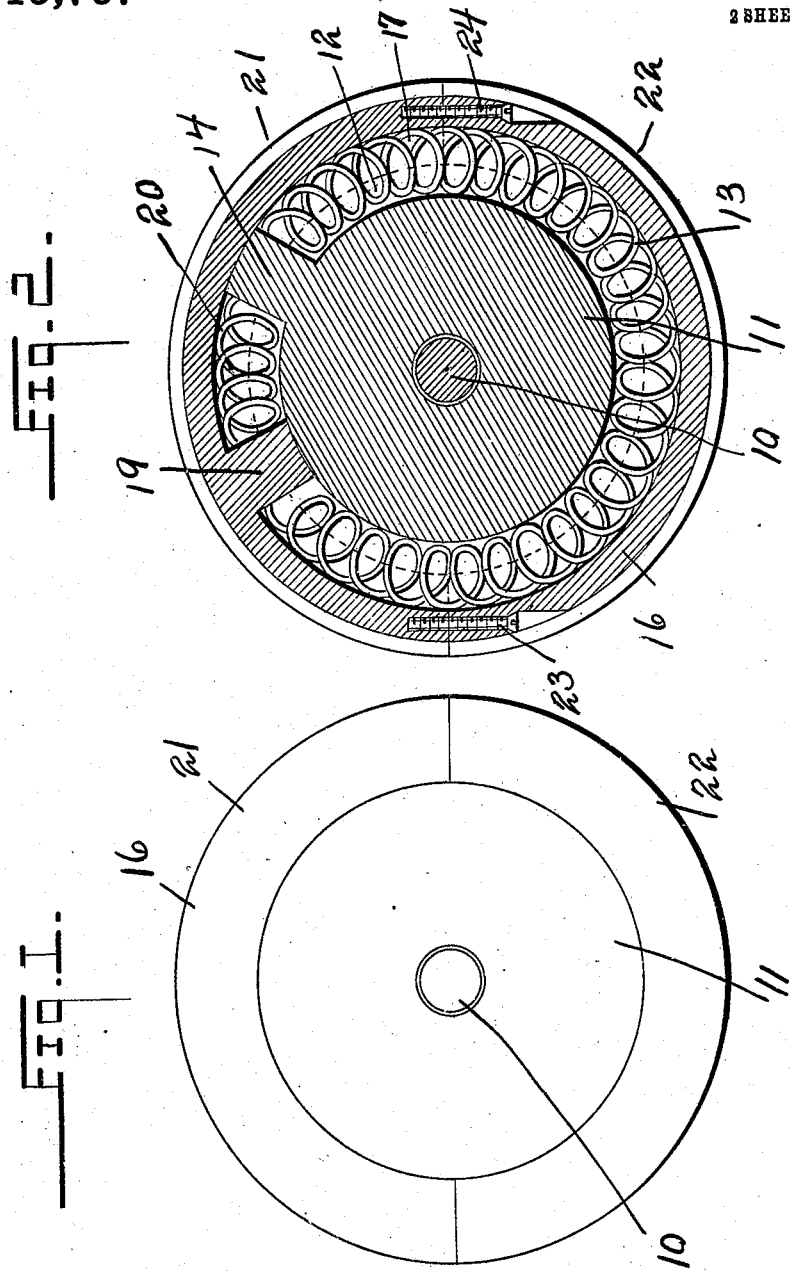

UNITED STATES PATENT OFFICE.

RALPH L. RAYMER, OF FORTUNA, CALIFORNIA.

YIELDING GEAR.

No. 919,767.   Specification of Letters Patent.   Patented April 27, 1909.

Application filed July 28, 1908. Serial No. 445,798.

*To all whom it may concern:*

Be it known that I, RALPH L. RAYMER, a citizen of the United States, residing at Fortuna, in the county of Humboldt and State of California, have invented certain new and useful Improvements in Yielding Gears, of which the following is a specification.

This invention relates to yielding gears, having especial reference to a pulley of this description.

An object of this invention is to provide a means whereby the shock incident to the operation of an internal combustion engine may be eliminated in the transmission of the power.

Another object of the invention is the provision of a device of this character which is simple of operation and simple in construction so that the same may be easily disassembled and so that it will be durable to withstand rough usage.

Other objects and advantages will be apparent from the following description and it will be understood that changes in the specific structure shown and described may be made within the scope of the claim without departing from the spirit of the invention.

In the drawings forming a portion of this specification and in which like numerals of reference indicate similar parts in the several views, Figure 1 is a side elevation of the gear, Fig. 2 is vertical longitudinal section through the same, Fig. 3 is a vertical transverse section of Fig. 1.

Referring now more particularly to the drawings 10 designates a suitable shaft upon which is keyed a pulley 11. The pulley 11 is provided in its periphery with a semicircular slot or groove 12 in which is adapted to be positioned a coil spring 13. A circular block 14 is rigidly positioned at one point in the groove 12 against which one end of the spring is adapted to impinge. The opposite edges of the pulley 11 which are disposed on the opposite sides of the groove 12 are each provided with annular grooves 15 of considerably reduced size. A split ring 16 is adapted to be clamped around the periphery of the pulley 11 and is provided upon its inner face with an annular semicircular groove adapted to register with the groove 12 and form a complete circle so as to entirely incase the spring 13. The opposite inner edges of the split ring which are disposed upon the opposite sides of the groove 17 are provided with outwardly extending beads 18 which are adapted to engage in the grooves 15 carried in the periphery of the pulley 11. The split ring 16 is provided with a circular block 19 which is rigidly carried at one point in the groove 17 for the purpose of impinging the opposite extremity of the spring 13.

It is readily seen that the tension of the spring 13 tends to slide the split ring 16 about the pulley 11 until the member 14 and the block 19 engage one another. For the purpose of preventing this movement a second coil spring 20 is employed which is positioned between the opposite faces of the circular blocks 14 and 19 for the purpose of separating the same. The ring 16 comprising two sections 21 and 22 which are adapted to be placed about the pulley 11 as before described and held in such position by the countersunk screws 23 and 24.

The operation of the device is as follows: The shaft 10 is adapted to be connected to the source of power while the ring 16, which is provided with a peripheral groove of any structure is adapted to receive an endless belt for the purpose of transmitting the power from the shaft 10 to any convenient or desirable point. Instead of the peripheral groove 25 a plurality of teeth could be employed for the purpose of engaging a chain for the purpose of transmitting the power from said shaft. While the gear is in operation when vibrations or shocks are imparted to the shaft 10, the pulley 11, being driven suddenly forward against tension of the spring 13, compresses the same and allows the shaft 10 to advance, the tension being taken up gradually by the ring 16 or by the decrease in the speed of the shaft 10.

What is claimed is:

A device of the character described comprising a shaft, a pulley mounted rigidly upon the shaft, a ring disposed about the periphery of the pulley, said pulley and said ring being provided with registering semicircular grooves, in their mutually adjacent faces, said pulley being also provided with two small grooves one at each side of its first named groove, said ring having beads at opposite sides of its first named groove and engaged in the second named groove of the pulley, a coil spring disposed in the registering grooves of the ring and pulley, said pulley and ring each having a block lying in the registering grooves, a coil spring disposed in the registering grooves and engaging at its end against the outer faces of said blocks and a second spring positioned between the blocks and engaging the inner faces thereof.

In testimony whereof I affix my signature, in presence of two witnesses.

RALPH L. RAYMER.

Witnesses:
    EMORY WALSH,
    GUY RAYMER.